United States Patent Office 3,231,545
Patented Jan. 25, 1966

3,231,545
POLYAMIDES FROM FATTY DIMER DIAMINES AND PROCESS OF PREPARING SAME
Leonard R. Vertnik and Harold Wittcoff, Minneapolis, Minn., assignors to General Mills Inc., a corporation of Delaware
No Drawing. Filed Jan. 2, 1962, Ser. No. 163,892
3 Claims. (Cl. 260—78)

This invention relates to high molecular weight polymeric compounds and to the process of preparing same. More particularly it relates to polyamides prepared from fatty dimer diamines and certain aromatic compounds.

It is one object of our invention to provide new polyamides of dimer diamines and terephthalyl and isophthalyl chlorides, acids and esters.

Another object of the present invention is to provide such polyamides wherein a portion of the dimer diamine is replaced by a second diamine.

A further object is to provide new and valuable polyamides which are useful as casting resins, surface coatings, adhesive materials, fibre forming compositions and the like.

Still another object of the invention is to provide a method of preparing the above described polyamides.

We have discovered that high molecular weight polymeric products can be obtained by reacting dimer diamines with terephthalyl and isophthalyl chlorides, acids and esters. Additionally, a portion of the dimer diamine can be replaced by a second diamine. The linear polyamides have the following recurring structural unit:

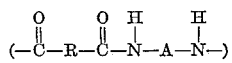

where R is a radical selected from the group consisting of

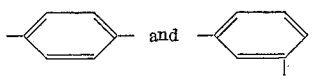

and A is selected from the group consisting of R' and mixtures of R' and R" where R' is a dimeric fat radical and R" is a radical derived from a diamine other than the dimer diamine. The polyamides are normally prepared from equivalent amounts of the diamine and aromatic acidic compound. In such cases they can be further characterized by the following formula:

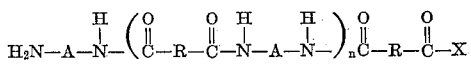

where R and A have the meanings set forth hereinabove, $n$ is an integer which represents the degree of polymerization and X is Cl, OH or OR''' where R''' is a hydrocarbon radical, such as an alkyl group containing 1–8 carbon atoms. The value of $n$ can vary widely but is generally in the range of about 5 to about 200. If a slight excess of diamine is used in preparing the polyamide, the end groups thereof will normally be amine groups according to the following formula:

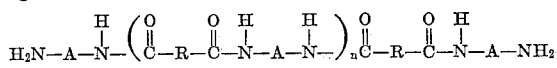

A slight excess of aromatic acidic compound will produce a polymer having the formula:

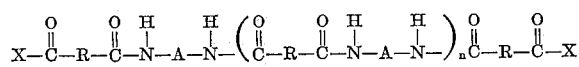

The dimer diamines useful in producing the polyamides of the present invention are prepared from dimerized fat acids. Said dimerized fat acids are reacted with ammonia to obtain the corresponding dimerized fat nitrile which is then hydrogenated to the dimer diamine.

Relatively pure dimerized fat acids can be distilled from commercially available polymeric fat acid mixtures. The term "polymeric fat acid" refers to a polymerized fat acid. The term "fat acid" as used herein refers to naturally occurring and synthetic monobasic aliphatic acids having hydrocarbon chains of 8 to 24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they are all generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include clays, di-t-butyl peroxide, boron trifluoride and other Lewis acids, anthraquinone, sulfur dioxide and the like. Suitable monomers include the branched and straight chain, poly and mono ethylenically unsaturated acids such as 3-octenoic acid, 11-dodecenoic acid, linderic acid, lauroleic acid, myristoleic, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. Acetylenically unsaturated acids occur only rarely in nature and are expensive to synthesize. Therefore, they are not currently of commercial significance. Any acetylenically unsaturated fat acid, both straight chain and branched chain, both mono- and polyunsaturated, are useful for the preparation of the polymeric fat acids. Suitable examples of such materials include 10-undecanoic acid, tariric acid, stearolic acid, behenolic acid and isamic acid.

Because of their ready availability and relative ease of polymeriation, oleic acid and linoleic acid are the preferred starting materials for the preparation of the polymeric fat acids.

The dimerized fat acid is converted to the corresponding dinitriles by reacting the dimerized fat acid with ammonia under nitrile forming conditions. The details of this reaction are set forth in Chapter 2 of "Fatty Acids and Their Derivatives," by A. W. Balston, John Wiley and Sons, Inc., New York (1948). The dinitrile is then purified by vacuum distillation or other suitable means. After such purification, the dinitrile is hydrogenated to form the dimer diamine which is also purified by vacuum distillation or other suitable means. It is essential that the diamine be of high purity in order to obtain the linear polymers of high molecular weight of the present invention. For purposes of convenience, only one dimer diamine was used in the examples to follow. This was distilled dimer diamine derived from dimerized fat acids consisting essentially of a mixture of dimerized, linoleic and oleic, acids.

As indicated above, the dimer diamines are reacted with a suitable aromatic acidic compound to form the polyamides. Such aromatic acidic compounds are terepththalyl and isophthalyl chlorides, acids and esters. The esters may be alkyl or aryl such as dimethyl terephthalate, diethyl trephthalate, diphenyl terephthalate and the like. The isophthalate esters are equally suitable. Additionally, the aromatic nucleus of the above reactants can be substituted by radicals such as lower alkyl (i.e., methyl, ethyl), nitro, hydroxyl and the like.

$n + 1H_2N-A-NH_2 + n + 1Cl-$ 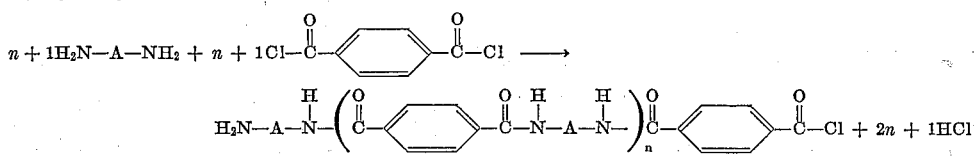

A portion of the dimer diamine may be replaced by a second diamine having the following general formula:

$$H_2N-RNH_2$$

where R is selected from the group consisting of aliphatic, aromatic and ether containing groups of about 2 to about 20 carbon atoms. Representative of such compounds are:

Ethylene diamine
Propylene diamine
1, 2-diaminobutane
1, 3-diaminobutane
Trimethylene diamine
Tetramethylene diamine
Pentamethylene diamine
Hexamethylene diamine
Decamethylene diamine
Octadecamethylene diamine
Metaxylene diamine
Paraxylene diamine
Cyclohexylene diamine
Bis-aminoalkyl ethers Other diamines of the above general formula may also be used as well as hydrazine and heterocyclic diamines such as piperazine. The equivalent ratio of the dimer diamine to the above-described second diamine may be in the range of 95:5 to 5:95. Ratios of 25:75 to 75:25 are preferred.

The polyamides are prepared by reacting substantially equivalent amounts of the aromatic acidic compound and the dimer diamine or mixtures thereof with the second diamine. A relatively small excess of either the aromatic reactant or the diamine may also be used. A small excess of diamine will produce a product consisting of relatively long polymeric molecules bearing amino groups at each end. If the product molecule is exceedingly long, it must, of course, be derived from almost exactly equivalent amounts of aromatic compound and diamine. This does not mean, however, in practice that it will be necessary to have the amine and aromatic compound present in exactly equivalent amounts initially in order finally to obtain molecules of very great length. A part of the excess diamine or aromatic compound may be eliminated by volatilization or otherwise during the course of the reaction so that the ratio of the radicals derived from the two reactants is almost exactly equivalent in the final product.

The polyamides may be prepared from the diamines and terephthalyl or isophthalyl chloride by use of interfacial polycondensation. Thus the diamine and chloride are each dissolved in a suitable solvent such as hydrocarbon, i.e., benzene. The above solutions are then added separately to an aqueous solution of a suitable emulsifier. The aqueous phase should also contain a basic material such as sodium carbonate to neutralize liberated HCl. The hydrocarbon solution and the aqueous phase are stirred rapidly to form an emulsion and then stripped free of the solvent which breaks the emulsion and causes the polyamide to granulate. The granules are removed by filtration, washed and dried. The reaction is as follows:

where A and $n$ have the same meanings as set forth hereinabove.

The polyamides of the present invention can also be prepared from isophthalyl and terephthalyl esters and acids. This reaction is effected by heating the materials at such a temperature that polyaminolysis of the esters or the dehydration of the polyamine salts of the acids will occur rapidly. In general, at the beginning of the reaction, it will be desirable to use temperatures above 120° C. and preferably in the neighborhood of 150° to 180° C. The final temperature will usually be above 200° C. and may be as high as 280° to 290° C.

The operating temperature and time of reaction vary, depending on the nature of the starting materials and the properties desired in the final products. The reaction is usually carried out at atmospheric or greater than atmospheric pressure, although toward the end of the reaction it is advantageous to operate in vacuum. This procedure aids in effecting contact of reaction products and removal of reaction by-products and therefore in driving the reaction toward completion. If desired, the condensation may be effected in the presence of suitable solvents or dispersing media, provided such media do not interact to any appreciable extent with the other components of the mixture and have boiling points sufficiently high to allow the temperature to be maintained at the desired level. Since the amines and esters or acids will have appreciable and, in general, different volatilities, it may be necessary to operate under a reflux condenser or in a closed vessel under pressure to reduce the loss of reactants. Also, the more volatile products such as alcohol, phenol or water can be removed by passage of the distillate through a fractionating tower and returning the less volatile material to the reaction chamber. This procedure will hasten the reaction towards completion. The reaction using equivalent amounts of diamine and ester can be demonstrated by the following:

$n + 1H_2N-A-NH_2 + n + 1R'''-O-$ 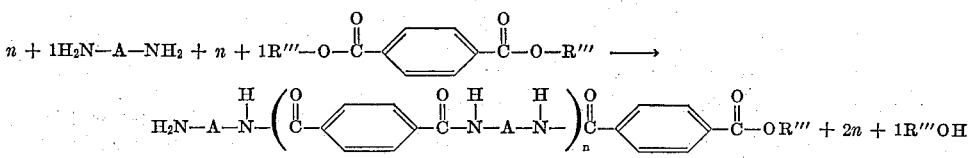

The invention will be better understood with respect to the following examples which illustrate certain preferred embodiments of the present invention.

*Example I*

To 400 ml. of distilled water containing 1 g. Dupanol ME (an emulsifier consisting mainly of sodium lauryl sulfate, manufactured by E. I. du Pont de Nemours & Company) in a Waring Blendor of 1000 ml. capacity were added 200 ml. of benzene containing 13.7 g. (0.05 eq.) of distilled dimer diamine derived from dimerized fat acids. The mixture was stirred and 5.3 g. (0.05 mole) of $Na_2CO_3$ was added with additional stirring. To the resulting dispersion was added almost all at once a solution of 5.08 g. (0.05 eq.) of terephthalyl chloride in 150 ml. of benzene. This mixture was stirred rapidly for 2–3 minutes and then stripped free of benzene which broke the emulsion and caused the polyamide to granulate. The granules were removed by filtration, washed with hot water until the wash water was free of $Cl^-$ and then dried under water-pump vacuum at 75° C. until a constant weight was obtained. The resulting white, granular polyamide had an inherent viscosity in meta-cresol of 0.434 and a capillary melting point of 156–170° C.

Example II

The procedure of Example I was repeated but isophthalyl chloride was substituted for terephthalyl chloride. The resulting white, granular polyamide had an inherent viscosity of 0.314 and a capillary melting point of 90–123° C.

Example III

Mixtures of distilled dimer diamine derived from dimerized fat acids and hexamethylene diamine were reacted with terephthalyl chloride using the same procedure and reaction ratios described in Example I. The diamine ratios, inherent viscosities and capillary melting points of the white, granular, opaque products are set forth in Table I.

TABLE I

| Ratio Eq. HMDA to Eq. Dimer Diamine | Inherent Viscosity | Capillary Melting Point, °C. |
|---|---|---|
| 5/95 | 0.39 | 168–212. |
| 10/90 | 0.40 | 170–214. |
| 25/75 | 0.39 | Charred at 263. |
| 75/25 | Insoluble | >263° (color change). |

Example IV

Example III was repeated except that piperazine was substituted for hexamethylene diamine. The diamine ratios and results are set forth in Table II.

TABLE II

| Ratio Eq. Piperazine to Eq. Dimer Diamine | Inherent Viscosity | Capillary Melting Point, °C. |
|---|---|---|
| 10/90 | 0.389 | 190–195. |
| 15/85 | 0.415 | 178–205. |
| 25/75 | 0.371 | Charred at 255. |
| 50/50 | 0.667 | >280. |
| 75/25 | 0.867 | >255. |
| 90/10 | 1.148 | >255. |

Examples V–VIII

Mixtures of other diamines and the dimer diamine at 50/50 equivalent ratios were reacted with terephthalyl chloride using the procedure described in Example I. The particular diamine used, the melting points and inherent viscosities are set forth in the following Table III.

TABLE III

| Example | Diamine | Inherent Viscosity | Capillary Melting Point, °C. |
|---|---|---|---|
| V | Metaxylene diamine | 0.550 | >280. |
| VI | Ethylene diamine | Insoluble in Metacresol. | >280. |
| VII | Hydrazine | do | >280. |
| VIII | N,N-propylamino oleylamine | 0.450 | 175–205. |

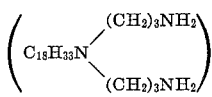

As stated previously, the linear polyamides of the present invention can be used as casting resins, adhesives, coatings, fibre forming materials and so forth. The use thereof as coatings and in the preparation of castings is shown by the following examples:

Examples A–C

The polyamides of Example I, Example IV (ratio eq. piperazine to eq. dimer diamine of 15/85), and Example VIII were dissolved in a solvent mixture of 2 parts n-butanol and 1 part toluene to provide 15% solids solutions. These solutions were drawn on tin plate using a 3 mil doctor blade to give dry films of about 0.45 mil thickness. The films were baked for 30 minutes at 300° F. in a forced draft oven. The films were then tested for gloss, hardness and extensibility. The results of these tests are set forth in the following Table IV.

TABLE IV

| Example | Polyamide of— | Film Evaluation | | | |
|---|---|---|---|---|---|
| | | Gloss | Pencil Hardness | Sword-Rocker Hardness, Percent | Extensibility, Percent |
| A | Exp. I | High | HB | 43 | >60 |
| B | Exp. IV | Satin Finish | B–HB | 26 | >60 |
| C | Exp. VIII | Dull | B–HB | 28 | >60 |

The above coatings were softened by $H_2O$, mineral spirits, 5% aqueous acetic acid and 50% ethyl alcohol. However, even after 24 hours immersion in said solvents, the coatings still had good adhesion to the tin plate—i.e., none of the films peeled.

Examples D and E

The polyamide of Examples I and IV (same as described in Example B) were cast into 1/16 inch sheets at molding temperatures of 350° F. and 415° F. under a pressure of 300 p.s.i. The resulting hard, dense sheets had tensile strengths of 2700 p.s.i. (Example D) and 1951 p.s.i. (Example E) as measured on the Inston Testing Machine. The casting of Example D also had a maximum elongation of 250%.

It is to be understood that the invention is not to be limited to the exact details of operation or the exact compositions shown and described, as obvious modifications and equivalents will be apparent to those skilled in the art and the invention is to be limited only by the scope of the appended claims.

We claim:
1. A linear polyamide consisting essentially of the reaction product of (1) an aliphatic diprimary diamine wherein the aliphatic group is a hydrocarbon dimeric fat radical and (2) a member selected from the group consisting of isophthalic acid and terephthalic acid and the chlorides and the alkyl and aryl esters thereof.
2. A linear polyamide consisting essentially of the reaction product of (1) a mixture of organic diamines wherein one of said diamines is an aliphatic diprimary diamine in which the aliphatic group is a hydrocarbon dimeric fat radical and (2) a member selected from the group consisting of isophthalic and terephthalic acid and the chlorides and the alkyl and aryl esters thereof.
3. A linear polyamide as defined in claim 2 in which the equivalent ratio of dimeric fat diamine to the remaining organic diamines is in the range of 95:5 to 5:95.

References Cited by the Examiner

UNITED STATES PATENTS 2,174,619 10/1939 Carothers _____ 260—78
2,450,940 10/1948 Cowan et al. _____ 260—78
2,831,834 4/1958 Magat _____ 260—78

WILLIAM H. SHORT, Primary Examiner.

J. R. LIBERMAN, Examiner.